United States Patent
Maney et al.

(10) Patent No.: US 12,499,450 B1
(45) Date of Patent: *Dec. 16, 2025

(54) MICRO INSURANCE AND WARRANTY CATALOGING, DETECTION AND EVALUATION SYSTEM

(71) Applicant: United Services Automobile Association (USAA), San Antonio, TX (US)

(72) Inventors: Will Kerns Maney, San Antonio, TX (US); Elena Marie Carrasco, San Antonio, TX (US); David Patrick Dixon, Boerne, TX (US); Subhalakshmi Selvam, Allen, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/906,142

(22) Filed: Oct. 3, 2024

Related U.S. Application Data

(63) Continuation of application No. 16/917,363, filed on Jun. 30, 2020, now Pat. No. 12,136,094.

(51) Int. Cl.
*G06Q 30/012* (2023.01)
*G06Q 10/10* (2023.01)
*G06Q 10/20* (2023.01)
*G06Q 40/08* (2012.01)

(52) U.S. Cl.
CPC ......... *G06Q 30/012* (2013.01); *G06Q 10/10* (2013.01); *G06Q 10/20* (2013.01); *G06Q 40/08* (2013.01)

(58) Field of Classification Search
CPC ...... G06Q 30/012; G06Q 10/10; G06Q 10/20; G06Q 40/08
See application file for complete search history.

(56) References Cited

U.S. PATENT DOCUMENTS

| | | |
|---|---|---|
| 9,886,723 B1 | 2/2018 | Devereaux et al. |
| 10,055,793 B1 | 8/2018 | Call et al. |
| 10,181,159 B1 | 1/2019 | Allen et al. |
| (Continued) | | |

OTHER PUBLICATIONS

Marafie, Z., Lin, K. J., Zhai, Y., & Li, J. (Jul. 2018). Proactive fintech: Using intelligent iot to deliver positive insurtech feedback. In 2018 IEEE 20th conference on business informatics (CBI) (vol. 2, pp. 72-81). IEEE. (Year: 2018).*

(Continued)

*Primary Examiner* — John S. Wasaff
(74) *Attorney, Agent, or Firm* — Perkins Coie LLP

(57) ABSTRACT

Insurance and warranty cataloging, detection and evaluation techniques are described for a micro insurance or warranty system. An example method for an insurance or warranty system includes receiving, at a server, an error code from a device of a user, processing the error code to extract sensor data related to one or more failed components of the device, determining the one or more failed components is covered within an insurance policy or warranty based on the sensor data, and issuing an insurance claim or warranty claim based on the one or more failed components being covered. In some embodiments, the micro insurance or warranty system includes analyzing the sensor data to determine the cause of the one or more failed components.

20 Claims, 4 Drawing Sheets

(56) References Cited

U.S. PATENT DOCUMENTS

| | | |
|---|---|---|
| 10,679,296 B1 | 6/2020 | Devereaux et al. |
| 2004/0103012 A1 | 5/2004 | Nussbaum et al. |
| 2005/0131768 A1 | 6/2005 | Rodriguez et al. |
| 2006/0149808 A1 | 7/2006 | Weiner et al. |
| 2007/0229032 A1* | 10/2007 | Elder .................. H01M 10/48 320/132 |
| 2008/0141076 A1 | 6/2008 | Hu et al. |
| 2009/0112907 A1 | 4/2009 | Mukherjee et al. |
| 2011/0090092 A1 | 4/2011 | Birrell et al. |
| 2012/0053870 A1 | 3/2012 | Landry et al. |
| 2013/0198574 A1* | 8/2013 | Higley ................ G06F 11/0727 714/45 |
| 2013/0218781 A1 | 8/2013 | Simon et al. |
| 2014/0214750 A1 | 7/2014 | Healy et al. |
| 2014/0228062 A1 | 8/2014 | Rubowitz |
| 2015/0032638 A1 | 1/2015 | Dintenfass et al. |
| 2015/0127556 A1 | 5/2015 | Harada et al. |
| 2016/0155315 A1 | 6/2016 | McElhinney et al. |
| 2016/0275521 A1 | 9/2016 | Afshar et al. |
| 2016/0300316 A1 | 10/2016 | Beseda et al. |
| 2016/0328282 A1 | 11/2016 | Rogati et al. |
| 2017/0004508 A1 | 1/2017 | Mansfield et al. |
| 2017/0091634 A1 | 3/2017 | Ritter et al. |
| 2018/0181967 A1 | 6/2018 | Beaston et al. |
| 2018/0240124 A1 | 8/2018 | Natarajan et al. |
| 2019/0266651 A1 | 8/2019 | Ndolo |
| 2019/0266720 A1 | 8/2019 | Dwivedi et al. |
| 2019/0287117 A1 | 9/2019 | Danyluk et al. |
| 2020/0097921 A1 | 3/2020 | Ghosh et al. |
| 2020/0143481 A1 | 5/2020 | Brown et al. |
| 2020/0193993 A1 | 6/2020 | Levy et al. |
| 2020/0258057 A1 | 8/2020 | Farahat et al. |
| 2020/0294062 A1 | 9/2020 | Gujral |
| 2020/0302549 A1 | 9/2020 | Jordan, II et al. |

OTHER PUBLICATIONS

Wang, M. et al., "An IoT-based appliance control system for smart homes," 2013 fourth international conference on intelligent control and information processing (ICICIP), pp. 744-747, IEEE, Year: 2013.

Khan, M. et al., "Internet of things based energy aware smart home control system," IEEE Access, 4, 7556-7566, Year: 2016.

Kostyukov, V.N. et al., "Real-time condition monitoring of machinery malfunctions," Procedia Engineering, 113, 316-323, Year: 2015.

Castillo, Juan, "Gadget Insurance Guide for Smartphones, Tablets and Other Devices," accessed at: https://www.nerdwallet.com/article/insurance/gadget-electronics-insurance, Year: 2016.

\* cited by examiner

MICRO INSURANCE AND WARRANTY CATALOGING, DETECTION AND EVALUATION SYSTEM

CROSS-REFERENCE TO RELATED APPLICATIONS

This application is a continuation of U.S. patent application Ser. No. 16/917,363 filed Jun. 30, 2020, now allowed, which is hereby incorporated by reference in its entirety for all purposes.

A user purchases insurance or warranties for devices or items that they want to have replaced or fixed if the devices fail. Users can have warranties and/or insurance policies on many products, and each warranty or insurance policy has different terms and is offered by different companies (e.g., manufacturers, retailers, insurance companies). Thus, keeping track of the warranty or insurance company for each device becomes challenging when a device fails.

Figure 1:
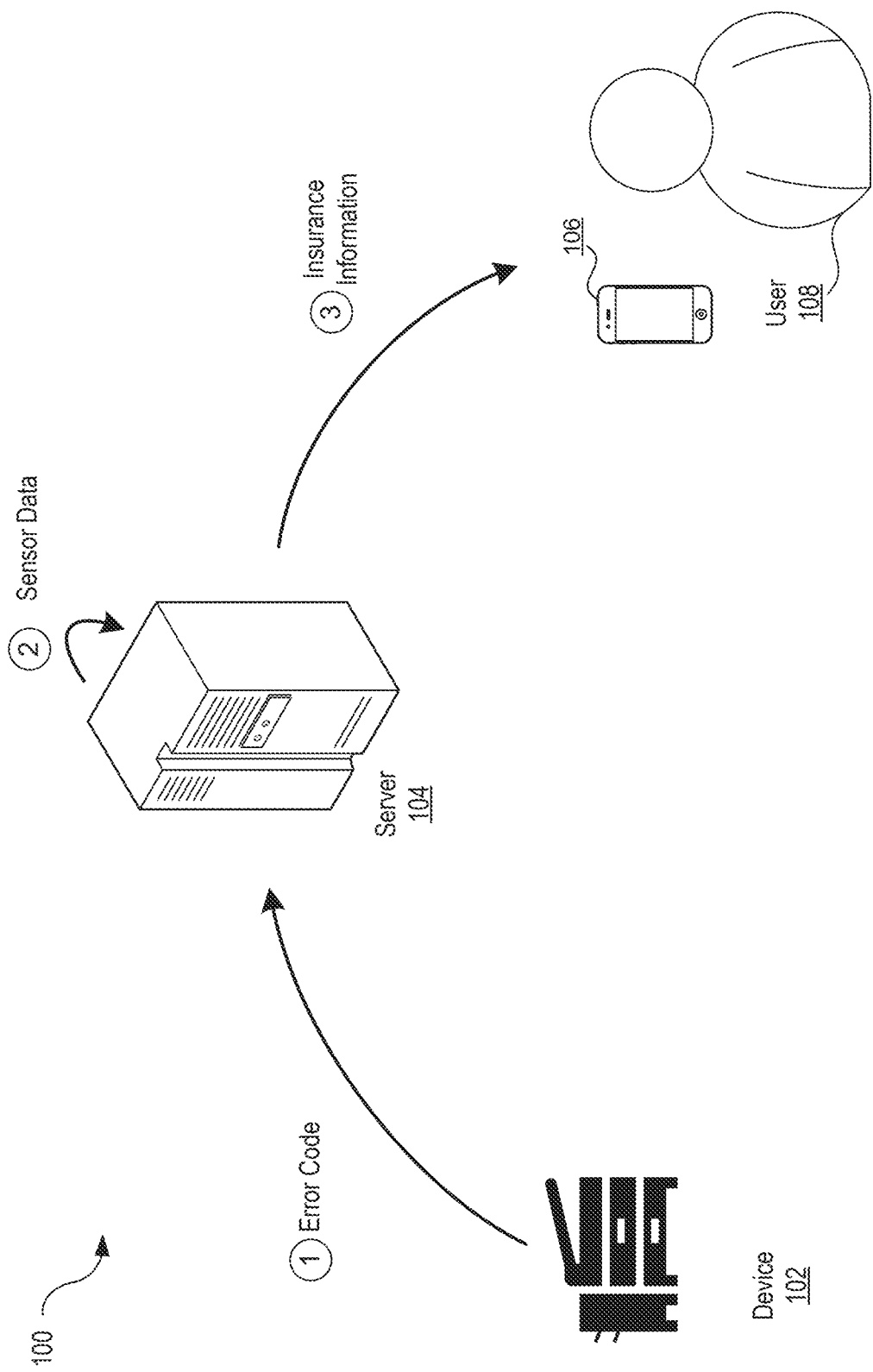
FIG. 1 shows an example overview of operations performed in a micro insurance or warranty detection and evaluation system for data processing.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A user can purchase a variety of devices (e.g., phone, computer, microwave, refrigerator, etc.). Depending on the value of the devices and importance to the user, a user can purchase a warranty or insurance policy to replace or fix the devices when a failure occurs that is covered by the warranty or the insurance policy. Manufacturers, retailers, insurance companies and other companies can provide warranties or insurance policies on a device-specific basis and thus users can have a variety of different warranties or insurance policies with various providers. When a device covered by an insurance policy or a warranty fails, it is challenging for a customer to determine whether the device is covered, the company that offered the policy and whether the failure is covered by the warranty or insurance policy. Thus, a system that tracks insurance policies and warranties for a user and automatically detects whether a failure is covered by an insurance policy or warranty is needed.

In an embodiment, an entity can provide micro insurance for customer devices. The devices can be registered for the micro insurance or warranty by connecting to the insurance or warranty company server or a third party server that tracks all insurance policies and warranties for a user. The customer devices contain sensors which monitor the performance of the device. The sensors can detect a failure and send sensor data or related information to the server. The sensor data can be used to determine automatically whether the insurance claim or warranty should be paid (e.g., was failure caused by something covered by the insurance policy or warranty?). Notifications can be sent to the customer that the failure of the device will or will not be covered in an insurance claim or warranty and can be automatically resolved (e.g., a check issued, a part sent).

FIG. 1 shows an example overview of operations performed in a micro insurance or warranty detection and evaluation system 100 for data processing. In an example scenario, a user 108 registers device 102 (e.g., copier machine, refrigerator, microwave, oven, laptop, television monitor, etc.) for performance monitoring by connecting the device to server 104. Device 102 can contain sensors which monitor the performance of device 102. The sensor can collect data in any time increment (e.g., data can be collected every second, minute, day, week). In some implementations, sensors can monitor one or more components of the device 102 and notify the user 108 when maintenance is needed on the components and can detect a failure.

A sensor in device 102 can detect one or more failed components and generate an error code (e.g., diagnostic trouble code, hypertext transfer protocol (HTTP) status code, fault code, etc.) which indicates the failure. The error code indicates what component caused device 102 to fail. For example, the error code can indicate a refrigerator failed due to the control board experiencing an electrical surge. At operation 1, the device 102 sends the error code to server 104. Server 104 can be an insurance or warranty company server or a third-party server, which forwards the error code to the insurance or warranty server. In an embodiment, the device 102 can send sensor data to server 104 in addition to or without the error code.

At operation 2, the server 104 processes the error code to extract the sensor data related the failure of device 102. The server 104 can determine the components in device 102 which failed and the reasons for the failure. For example, the server 104 can determine based on the error code that the control board failed due to the surge protector on the refrigerator not stopping the electrical surge. After determining the cause of the component failure, the server 104 can analyze the insurance policy or warranty and determine whether the failure or damage is covered. In an embodiment, the server 104 receives the sensor data directly from device 102 and analyzes the sensor data to determine the cause of the one or more failed components. In another embodiment, the device 102 can lose connection with server 104, in which case the server 104 can use the most recent sensor data from device 102 to determine the cause of failure. In some embodiments, server 104 can access a database that stores the insurance policies and warranties covered by the device. The database can include error code identifiers that are covered and thus a remedy should be issued without further investigation and error code identifiers that are not covered and thus a denial of a remedy should be issued without further investigation. In some embodiments, the database can include error code identifiers that may result in recovery but that require further investigation. The further investigation can automatically start an investigation process (e.g., send service provider to user's home, request additional information such as images or answers to questions).

At operation 3, the server 104 sends a message to device 106 (e.g., smartphone, laptop, etc.). The message can notify user 108 whether the failed components will or will not be covered by the insurance claim or warranty. For example, the insurance company may not pay the insurance claim to replace the control board on the refrigerator due to the customer failing to replace the surge protector when it previously broke. In some implementations, the message can notify the user 108 that a warranty for the device will expire in a period of time and present options to renew the warranty. Depending on the type of failure, the user can receive a notification that the failure may be covered and steps to follow to verify whether the failure will be covered. In an embodiment, upon receiving a notification that the failure is not covered by the insurance or warranty, the user 108 can inquire on recommended vendors for repair, for example if maintaining the usage of the device 102 is still needed. In some implementations, the server 104 can monitor components of the device 102 and notify the user 108 when maintenance is needed on the components. In some implementations, the server 108 can send a recommendation or connect the user 108 with a maintenance service or self-repair parts when applicable.

Methods and systems disclosed herein can provide technical advantages over conventional micro insurance or warranty detection and evaluation systems. For instance, the sensors collecting sensor data periodically alerts a user to perform maintenance resulting in the device running efficiently and consuming less energy. Additionally, transmitting a notification to the user of whether the failure is covered by a warranty or insurance claim, reduces signaling overhead (e.g., customers do not have to contact the manufacture or insurance company because the notification is sent directly to the customer). Sending the error code and not the sensor data, reduces overhead signaling and reduces the processing demand at the server. Additionally, as edge computing becomes ubiquitous, a sophisticated diagnosis of the device's performance along with a route of correction/repair can be determined and used by the server to process high level solutions to present to a user. For example, a user enabled pre-ordering of an air-condition unit and scheduling an appointment with a certified installer. This model of microservices will increase the speed, flexibility, and scalability of the services in general, and will create an effective solution that can increase user satisfaction.

Figure 2:
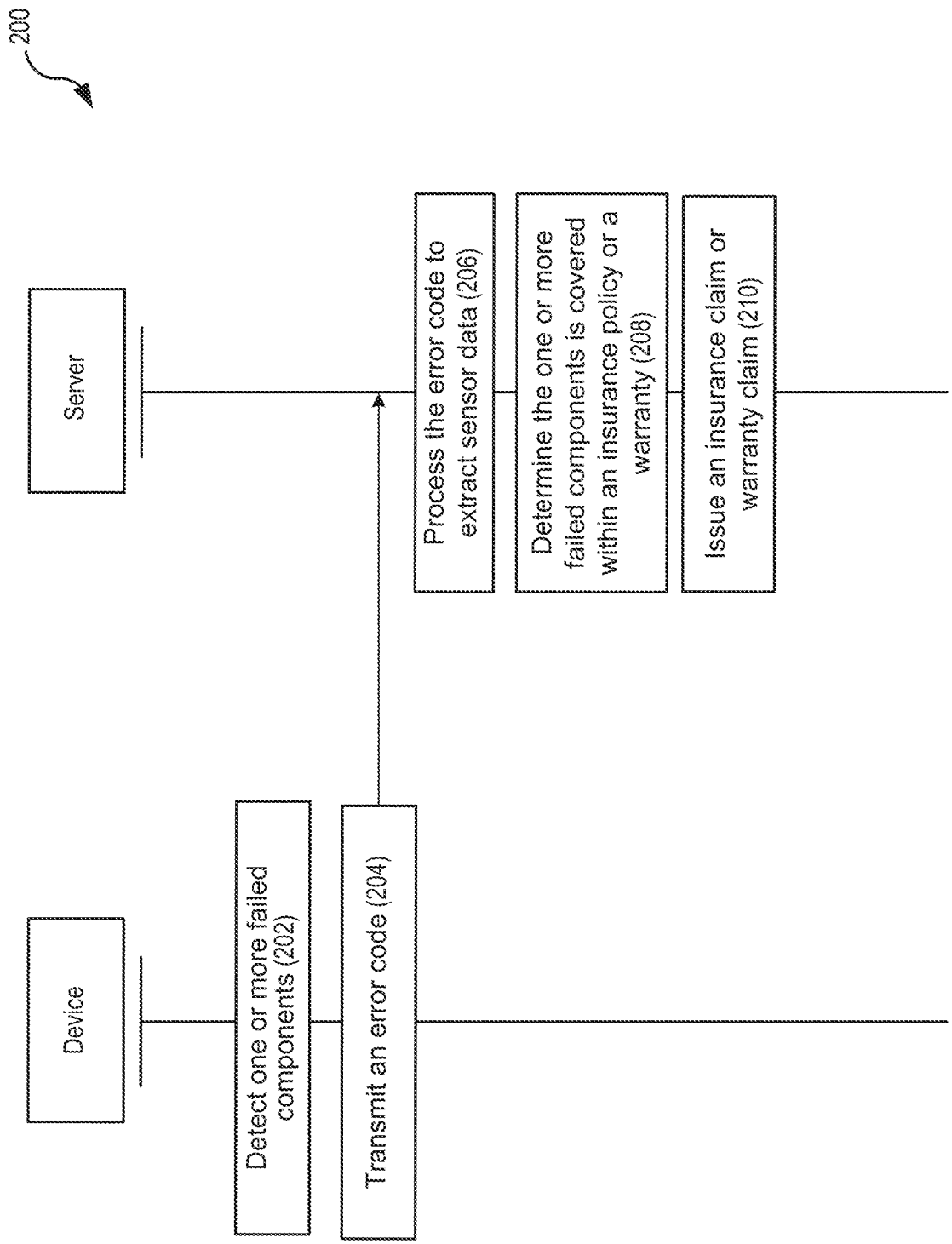
FIG. 2 shows an example flow diagram of operations performed by devices in a micro insurance or warranty detection and evaluation system.

FIG. 2 shows an example flow diagram of operations performed by devices in a micro insurance or warranty detection and evaluation system 200. A device can connect to a server, wherein the connection registers the device for performance monitoring. The device can contain sensors which collect data periodically to determine the operation status of the device. In some embodiments the sensors can notify a user to perform maintenance on the device.

At operation 202, sensors can detect one or more failed components in the device. The device can generate an error code which indicates the collected sensor data pertaining to the failed components. At operation 204, the device transmits the error code to the server. In some implementations, the device can send sensor data collected by the sensor to the server. At operation 206, the server receives and processes the error code to extract the sensor data related to the failed components.

The server can analyze the sensor data to determine the cause of the one or more failed components. At operation 208, the server determines the one or more failed components is covered within an insurance policy or a warranty based on the sensor data. At operation 210, the server issues an insurance claim or warranty claim based on the one or more failed components being covered. The server can notify the user that the one or more failed components is covered by the insurance policy or the warranty. In some implementations, the server can transmit a notification to the user that a warranty for the device will expire in a period of time. The server can present a selection to renew the warranty on the device.

In an embodiment, the server determines the one or more failed components is not covered within an insurance policy or a warranty based on the sensor data and transmits a notification to the user that the one or more failed components is not being covered. In another embodiment, the server collects sensor data from the device at any time to determine the operation status of the device. The server can notify the user to perform maintenance if the operational status is below a performance threshold.

Figure 3:
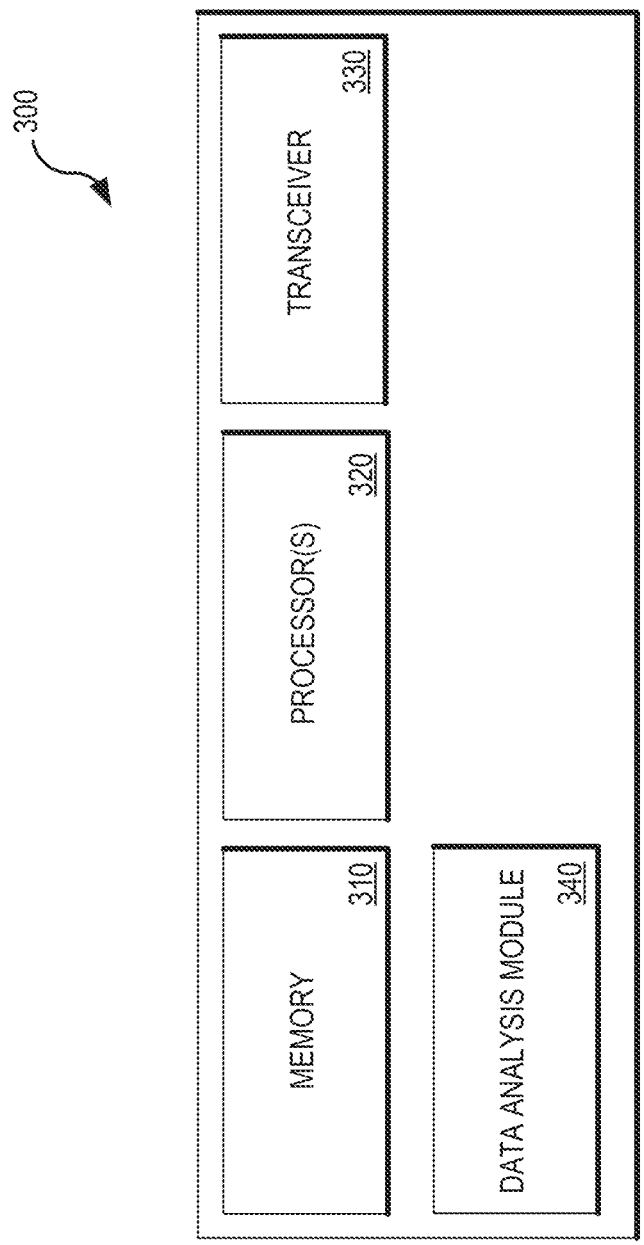
FIG. 3 shows an example of a block diagram of an insurance or warranty server.

FIG. 3 shows an exemplary block diagram of an insurance or warranty server 300. The insurance or warranty server 300 includes at least one processor 310 and a memory 320 having instructions stored thereupon. The instructions upon execution by the processor 310 configure the insurance or warranty server 300 to perform the operations described in FIGS. 1 and 2 and in the various embodiments described in this patent document. For example, the data analysis module 340 can perform the operations described in this patent document based on the processor 310 executing instructions stored on the memory 320. The transceiver 330 transmits or sends data or information or messages to or receives information from one or more computers (e.g., the device 102 or 106 as described herein).

Figure 4:
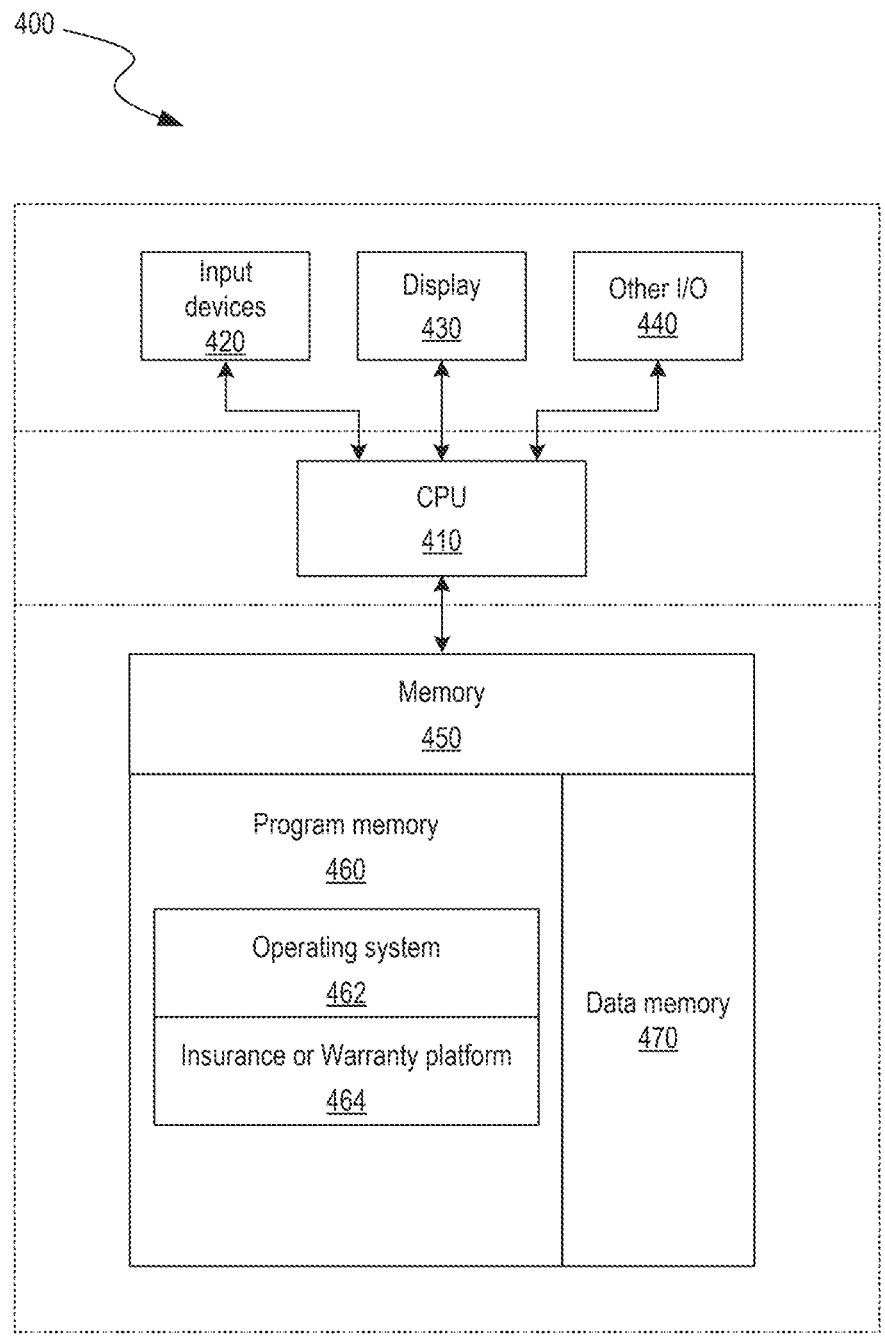
FIG. 4 is a block diagram illustrating an overview of devices on which some implementations of an insurance or warranty server or the client device can operate.

FIG. 4 is a block diagram illustrating an overview of devices on which some implementations of the insurance or warranty server, device 102, or device 106 can operate. The devices can comprise hardware components of a device 400, such as the insurance or warranty server, device 102, or device 106, all of which can include an insurance or warranty platform 464 that can in the insurance or warranty server perform operations related to the data analysis module.

Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a person operating the device 400. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, Fire Wire or other external device, camera, printer, speakers, CD-ROM drive, DVD drive, disk drive, or Blu-Ray device.

In some implementations, the device 400 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462 and call management platform 464. The insurance or warranty platform 464 may include modules or processes or methods, as described in FIGS. 1 to 3 of this patent document and/or in the various embodiments in this patent document. For example, the insurance or warranty platform 464 in the insurance or warranty server may include the data analysis module. In another example, the insurance or warranty platform 464 in the device 102 or 106 computer can display messages and/or display or playback audio of the summary of information or the at least some data received from the data analysis module of the insurance or warranty server. Memory 450 can also include data memory 470 that can include the various scores described in this patent document, which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in FIGS. 1 to 3 and/or in the various embodiments described in this patent document.

Those skilled in the art will appreciate that the components illustrated in FIG. 1-4 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

In this patent document, the terms "warranty" and "insurance" are used to simplify the description of the example data processing techniques. However, the data processing techniques described in this patent document can be applied in context other than where a device has sensors which collect sensor data and sends an error code to a server. In this patent document, the term device may include a phone, a smartphone, a laptop, etc.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A method of local-management of sensor data, the method comprising:
    monitoring one or more components of a device based on sensor data collected from at least one sensor unit of the device, by:
        determining, by the at least one sensor unit, a performance level of the one or more components of the device based on a first portion of the sensor data;
        in response to determining the performance level is below a performance threshold,
            locally generating, by the at least one sensor unit, a device-specific error code indicating the one or more components is operating below the performance threshold;
            sending, by the device, the device-specific error code to a performance monitoring system, wherein the device sends the device-specific error code without sending the first portion of the sensor data;
    receiving, at one or more servers associated with the performance monitoring system, the device-specific error code from the device;
    detecting, at the one or more servers, a connection failure between the one or more servers and the device based on monitoring communications with the device; and
    in response to detecting the connection failure,
        retrieving, from the one or more servers, a second portion of the sensor data different from the first portion of the sensor data; and
        determining a cause of failure of the device based on the second portion of the sensor data and at least one error code from the device.

2. The method of claim 1, further comprising:
    connecting the one or more servers to the device, wherein the connection registers the device for performance monitoring; and
    in response to the device being registered, receiving, at the one or more servers, error codes from the device.

3. The method of claim 1, further comprising:
    collecting the second portion of the sensor data from the at least one sensor unit periodically;
    determining an operational status of the device based on the second portion of the sensor data; and
    transmitting a notification to a user device to perform maintenance on the device based on the operational status.

4. The method of claim 1, further comprising:
    analyzing the second portion of the sensor data to determine a cause of the one or more components failing.

5. The method of claim 1, further comprising:
    determining the one or more components is covered by an insurance policy or warranty based on the second portion of the sensor data; and
    transmitting a notification to a user device that the one or more components is being covered.

6. The method of claim 1, further comprising:
    determining the one or more components is not covered by an insurance policy or warranty based on the second portion of the sensor data; and
    transmitting a notification to a user device that the one or more components is not being covered.

7. The method of claim 1, further comprising:
    sending a maintenance notification to a user device to perform maintenance on the one or more components, wherein the maintenance notification includes information of at least one maintenance service provider to perform maintenance on the one or more components.

8. A system comprising:
one or more processors; and
one or more memories storing instructions that, when executed by the one or more processors, cause the system to perform a process of local-management of sensor data, the process comprising:
  monitoring one or more components of a device based on sensor data collected from at least one sensor unit of the device, by:
    determining, by the at least one sensor unit, a performance level of the one or more components of the device based on a first portion of the sensor data;
    in response to determining the performance level is below a performance threshold,
      locally generating, by the at least one sensor unit, a device-specific error code indicating the one or more components is operating below the performance threshold;
      sending, by the device, the device-specific error code to a performance monitoring system, wherein the device sends the device-specific error code without sending the first portion of the sensor data;
    receiving, at one or more servers associated with the performance monitoring system, the device-specific error code from the device;
    detecting, at the one or more servers, a connection failure between the one or more servers and the device based on monitoring communications with the device; and
    in response to detecting the connection failure,
      retrieving, from the one or more servers, a second portion of the sensor data different from the first portion of the sensor data; and
      determining a cause of failure of the device based on the second portion of the sensor data and at least one error code from the device.

9. The system of claim 8, wherein the process further comprises:
connecting the one or more servers to the device, wherein the connection registers the device for performance monitoring; and
in response to the device being registered, receiving, at the one or more servers, error codes from the device.

10. The system of claim 8, wherein the process further comprises:
collecting the second portion of the sensor data from the at least one sensor unit periodically;
determining an operational status of the device based on the second portion of the sensor data; and
transmitting a notification to a user device to perform maintenance on the device based on the operational status.

11. The system of claim 8, wherein the process further comprises:
analyzing the second portion of the sensor data to determine a cause of the one or more components failing.

12. The system of claim 8, wherein the process further comprises:
determining the one or more components is covered by an insurance policy or warranty based on the second portion of the sensor data; and
transmitting a notification to a user device that the one or more components is being covered.

13. The system of claim 8, wherein the process further comprises:
determining the one or more components is not covered by an insurance policy or warranty based on the second portion of the sensor data; and
transmitting a notification to a user device that the one or more components is not being covered.

14. The system of claim 8, wherein the process further comprises:
sending a maintenance notification to a user device to perform maintenance on the one or more components, wherein the maintenance notification includes information of at least one maintenance service provider to perform maintenance on the one or more components.

15. A non-transitory computer-readable medium storing instructions that, when executed by a computing system, cause the computing system to perform operations of local-management of sensor data, the operations comprising:
  monitoring one or more components of a device based on sensor data collected from at least one sensor unit of the device, by:
    determining, by the at least one sensor unit, a performance level of the one or more components of the device based on a first portion of the sensor data;
    in response to determining the performance level is below a performance threshold,
      locally generating, by the at least one sensor unit, a device-specific error code indicating the one or more components is operating below the performance threshold;
      sending, by the device, the device-specific error code to a performance monitoring system, wherein the device sends the device-specific error code without sending the first portion of the sensor data;
    receiving, at one or more servers associated with the performance monitoring system, the device-specific error code from the device;
    detecting, at the one or more servers, a connection failure between the one or more servers and the device based on monitoring communications with the device; and
    in response to detecting the connection failure,
      retrieving, from the one or more servers, a second portion of the sensor data different from the first portion of the sensor data; and
      determining a cause of failure of the device based on the second portion of the sensor data and at least one error code from the device.

16. The non-transitory computer-readable medium of claim 15, wherein the operations further comprise:
connecting the one or more servers to the device, wherein the connection registers the device for performance monitoring; and
in response to the device being registered, receiving, at the one or more servers, error codes from the device.

17. The non-transitory computer-readable medium of claim 15, wherein the operations further comprise:
collecting the second portion of the sensor data from the at least one sensor unit periodically;
determining an operational status of the device based on the second portion of the sensor data; and
transmitting a notification to a user device to perform maintenance on the device based on the operational status.

18. The non-transitory computer-readable medium of claim 15, wherein the operations further comprise:
analyzing the second portion of the sensor data to determine a cause of the one or more components failing.

19. The non-transitory computer-readable medium of claim 15, wherein the operations further comprise:
- determining the one or more components is covered by an insurance policy or warranty based on the second portion of the sensor data; and
- transmitting a notification to a user device that the one or more components is being covered.

20. The non-transitory computer-readable medium of claim 15, wherein the operations further comprise:
- sending a maintenance notification to a user device to perform maintenance on the one or more components, wherein the maintenance notification includes information of at least one maintenance service provider to perform maintenance on the one or more components.

* * * * *